Patented June 16, 1942

2,286,546

UNITED STATES PATENT OFFICE 2,286,546

PURIFYING MATERIALS AND METHODS OF USING THE SAME

Robert C. Hopkins, Alliance, Ohio

No Drawing. Application November 17, 1941, Serial No. 419,451

7 Claims. (Cl. 75—93)

This invention is concerned with materials and methods for purifying metal, and, more specifically, relates to improved agents and methods for deoxidizing and desulphurizing non-ferrous metals, such as copper, tin, lead, nickel, zinc, or alloys thereof.

It is well understood in the manufacture of brasses, bronzes, or other non-ferrous metals including alloys of copper, zinc, lead, tin, and nickel, that undesirable oxides and sulphides occur under the usual production conditions, and when employing standard production methods and apparatus. Such oxides and sulphides impair the grain-structure and adversely affect the physical properties and strength of the materials. So far as I am aware, efforts to deoxidize and desulphurize non-ferrous metals during their manufacture have not resulted in a practical solution of the problem. Either very expensive apparatus must be employed and elaborate production control exercised, or very pure starting materials not available in commercial quantities must be used. Also, previous attempts to deoxidize and desulphurize tend to eliminate from the non-ferrous material being produced at least certain of the alloying ingredients of the material during the deoxidizing and desulphurizing operation, which is usually highly objectionable.

It is the general object of my invention to avoid and overcome the foregoing and other difficulties of and objections to prior art practices by the provision of improved agents and methods for purifying metals, and, specifically, non-ferrous metals, during their manufacture.

Another object of my invention is the provision of improved agents and methods for deoxidizing and desulphurizing brasses, bronzes, and the like, and which require only standard production apparatus, ordinary production control, and semi-skilled labor.

Another object of my invention is the provision of a deoxidizing agent which can be added to non-ferrous metals during the melting thereof, and prior to casting, and which will oxidize or otherwise purify the basic metal being produced.

Another object of my invention is to provide a relatively inexpensive, easily performed, rapid, and efficient method for deoxidizing or desulphurizing non-ferrous metals, such as copper, lead, tin, zinc, and/or alloys thereof during the manufacture of said materials.

Another object of my invention is the provision of an alloying agent which can be added to a brass, a bronze, or the like, during the normal manufacture thereof, and which will improve the grain structure, increase the tensile strength, elastic limit, percentage of elongation, and resistance to compression, and will at the same time improve the anti-friction properties of the base metal being produced.

In accordance with the principles of my invention, I provide a deoxidizing and desulphurizing agent including the following component parts: about 20.00 to about 40.00 per cent copper, about 50.00 to about 80.00 per cent zinc, and about 2.00 to about 10.00 per cent of a material or materials selected from a group including manganese, vanadium, titanium, beryllium, and calcium. Each one of the materials in the indicated group possesses in the combination recited a definite deoxidizing and desulphurizing action when added to non-ferrous metals, and when used in conjunction with the copper and zinc in approximately the amounts indicated.

I have found that it is sometimes advantageous to provide a definite relationship between the manganese, vanadium, titanium, beryllium, and calcium. Specifically, in my improved purifying agent, I may provide between .25 and 2.00 per cent iron, between .50 and 3.50 per cent manganese, between .10 and 2.00 per cent vanadium, between .10 and 3.00 per cent titanium, between .05 and 1.00 per cent beryllium, and between .40 and 4.00 per cent calcium. Of course, to the specific materials mentioned will be added between 20.00 and 40.00 per cent copper, and between 50.00 and 80.00 per cent zinc.

I have found that it is sometimes advantageous to hold the various ingredients of my improved purifying agent within closer limits when operating, for example, on brasses and bronzes, and when this is desired I provide a composition including between .25 and 1.00 per cent iron, between .50 and 2.50 per cent manganese, between .10 and 1.00 per cent vanadium, between .10 and 2.00 per cent titanium, between .05 and .50 per cent beryllium, between .40 and 2.00 per cent calcium, between 27.00 and 32.00 per cent copper, and between 62.00 and 70.00 per cent zinc.

A specific example of one material fulfilling the objects of my invention comprises the following composition: about .50 per cent iron, about 1.25 per cent manganese, about .25 per cent vanadium, about .25 per cent titanium, about .10 per cent beryllium, about 1.00 per cent calcium, about 30.00 per cent copper, and about 67.00 per cent zinc.

It will be recognized and understood that in the several examples of my invention set forth above that traces or small amounts of other ingredients or alloying materials or impurities may be present in unobjectionable amounts. Further, it should be noted here that if the desulphurizing action of my improved material is not important, and the primary purpose of the material is to act as a deoxidizing agent, then the calcium may be eliminated from the purifying material.

In the practice of the method of my invention, I add the deoxidizing, desulphurizing, and purifying material such as specifically described above, to the non-ferrous metal being purified. The purifying material of my invention may be added to the non-ferrous metal in amounts up to 10 per cent or even more of the non-ferrous metal. Usually 10 per cent is more than sufficient, and often considerably smaller amounts can be used. In other words, I may add up to 10 pounds of my purifying material to every 100 pounds of the non-ferrous metal, and this operation is ordinarily performed during the melting of the non-ferrous metal, and in a manner that will be readily understood by those skilled in the art. For convenience, the purifying material of my invention is usually cast into bars or pigs for convenience in handling, and the necessary amount of the bars or pigs will be added to the non-ferrous metal during the manufacture thereof, and as indicated.

In the operation of the method of my invention, the purifying material acts as a scavenger for clearing bronze, brass, or other non-ferrous metals, of oxides and sulphides by absorbing the oxygen and sulphur and turning the materials into metallic form usually with the formation of a slag which may be sloughed off. The method of purifying material can be used with copper-tin bronzes, copper-lead-nickel-tin, copper-lead-tin, nickel, a wide variety of brasses and bronzes, and broadly, with non-ferrous metals of a wide variety of characters. The result of the deoxidizing and desulphurizing action is to densify the metal and to produce a very finely divided and well distributed condition of the components. As a result of the improved close grain structure of the tensile strength, elastic limit, percentage of elongation, and resistance to compression of the non-ferrous metal treated is increased. Further, the normal anti-friction characteristics of the non-ferrous metal is improved so that the metal is particularly adapted to act as a bearing or other anti-friction material.

From the foregoing it will be recognized that the objects of my invention have been achieved by the provision of an improved purifying material for treating non-ferrous alloys, and by the provision of a relatively inexpensive, easily practiced method for deoxidizing, desulphurizing, or otherwise improving brasses, bronzes, and the like. The invention is readily practiced with standard production apparatus and methods, requires no elaborate production control, and may be practiced with the use of ordinary semi-skilled workmen.

While in accordance with the patent statutes I have specifically described my invention, it will be understood that I am not to be limited thereto or thereby, but that the scope of my invention is defined in the appended claims.

I claim:

1. The process of removing sulphur and oxygen from sulphides and oxides contained in non-ferrous metals which comprises adding to the non-ferrous metals an agent including between about 20.00 and about 40.00 per cent copper, between about 50.00 and about 80.00 per cent zinc, and between about 2.00 and about 10.00 per cent of a material or materials selected from a group consisting of manganese, vanadium, titanium, beryllium, and calcium.

2. The process of removing sulphur and oxygen from sulphides and oxides contained in non-ferrous metals which comprises adding to the non-ferrous metals while in a molten state up to 10.00 per cent by weight of an agent including between 20.00 and 40.00 per cent copper, between 50.00 and 80.00 per cent zinc, between .25 and 2.00 per cent iron, between .50 and 3.50 per cent manganese, between .10 and 2.00 per cent vanadium, between .10 and 3.00 per cent titanium, between .05 and 1.00 per cent beryllium, and between .40 and 4.00 per cent calcium.

3. The process of removing sulphur and oxygen from molten brasses, bronzes, and the like which comprises adding an agent including about .50 per cent iron, about 1.25 per cent manganese, about .25 per cent vanadium, about .25 per cent titanium, about .10 per cent beryllium, about 1.00 per cent calcium, about 30.00 per cent copper, and about 67.00 per cent zinc.

4. A non-ferrous metals deoxidizer and purifier comprising between about 20.00 and about 40.00 per cent copper, between about 50.00 and about 80.00 per cent zinc, and between about 2.00 and about 10.00 per cent of a material or materials selected from a group consisting of manganese, vanadium, titanium, beryllium, and calcium.

5. A deoxidizing and desulphurizing material for use with non-ferrous metals and comprising between .25 and 2.00 per cent iron, between .50 and 3.50 per cent manganese, between .10 and 2.00 per cent vanadium, between .10 and 3.00 per cent titanium, between .05 and 1.00 per cent beryllium, between .40 and 4.00 per cent calcium, and the remainder substantially copper and zinc in the proportion of about 1 part copper to about 2 parts zinc.

6. A deoxidizing and desulphurizing material for use with bronze metals, and the like, and comprising about .50 per cent iron, about 1.25 per cent manganese, about .25 per cent vanadium, about .25 per cent titanium, about .10 per cent beryllium, about 1.00 per cent calcium, about 30.00 per cent copper, and about 67.00 per cent zinc.

7. An alloy comprising between .25 and 1.00 per cent iron, between .50 and 2.50 per cent manganese, between .10 and 2.00 per cent titanium, between .05 and .50 per cent beryllium, up to 2.00 per cent calcium, between 27.00 and 32.00 per cent copper, and between 62.00 and 70.00 per cent zinc, said alloy being adapted to be used as a deoxidizing agent in the manufacture of non-ferrous metals including copper, tin, lead, zinc or alloys thereof.

ROBERT C. HOPKINS.